(12) United States Patent
Hsu

(10) Patent No.: US 11,632,502 B2
(45) Date of Patent: Apr. 18, 2023

(54) OPTICAL SENSOR CANCELLING IMAGE FLICKER

(71) Applicant: PIXART IMAGING INC., Hsin-Chu County (TW)

(72) Inventor: En-Feng Hsu, Hsin-Chu County (TW)

(73) Assignee: PIXART IMAGING INC., Hsin-Chu County (TW)

( * ) Notice: Subject to any disclaimer, the term of this patent is extended or adjusted under 35 U.S.C. 154(b) by 3 days.

(21) Appl. No.: 17/471,260

(22) Filed: Sep. 10, 2021

(65) Prior Publication Data
US 2023/0083218 A1    Mar. 16, 2023

(51) Int. Cl.
*H04N 5/235* (2006.01)
(52) U.S. Cl.
CPC ......... *H04N 5/2357* (2013.01); *H04N 5/2353* (2013.01)

(58) Field of Classification Search
CPC .......................... H04N 5/2357; H04N 5/2353
See application file for complete search history.

(56) References Cited

U.S. PATENT DOCUMENTS

2020/0213502 A1*   7/2020   Shigeta ................ H04N 5/2357

\* cited by examiner

*Primary Examiner* — Twyler L Haskins
*Assistant Examiner* — Angel L Garces-Rivera
(74) *Attorney, Agent, or Firm* — Hauptman Ham, LLP

(57) ABSTRACT

There is provided an optical sensor that acquires a first image frame corresponding to a first flicker period and acquires a second image frame corresponding to a second flicker period. The optical sensor adds the first image frame to the second image frame to generate a sum of image frames for the motion detection. Or, the optical sensor respectively adds pixel data of every two pixels in neighboring rows of the first image frame and the second image frame to generate a low-resolution image frame for the motion detection.

6 Claims, 8 Drawing Sheets

|    | reset PD1 | expose PD1 | reset PD2 | transfer PD1 & expose PD2 | transfer PD2 |
|----|-----------|------------|-----------|---------------------------|--------------|
| T3 | ON        | OFF        | ON        | OFF                       | OFF          |
| T1 | ON        | OFF        | OFF       | ON                        | OFF          |
| T2 | OFF       | OFF        | ON        | OFF                       | ON           |

FIG. 5C

OPTICAL SENSOR CANCELLING IMAGE FLICKER

BACKGROUND

1. Field of the Disclosure

This disclosure generally relates to an optical sensor and, more particularly, to an optical sensor that alleviates or even eliminates image flickers by adding two image frames or adding pixel data of two pixels at adjacent pixel rows of one image frame.

2. Description of the Related Art

The motion detector adopting an optical sensor identifies the object motion by calculating light intensity variation in image frames captured by the optical sensor. As indoor ambient light is sometimes provided by the fluorescent lamps that have flickers due to AC nature of the power system, when this kind of optical sensor is operated indoor, the average brightness of the image frames captured by the optical sensor can fluctuate between bright and dark if a frame rate of the optical sensor is not synchronized to a flicker frequency of ambient light such that incorrect motion may be identified. The flicker frequency of ambient light is determined according to an AC frequency of the power system.

For example referring to FIG. 1, it is a schematic diagram of acquiring image frames corresponding to ambient light fluctuation by a conventional optical sensor. When the optical sensor captures a first frame 1 while the ambient light fluctuates to its brightest intensity, the first frame 1 has the maximum average brightness; whereas when the optical sensor captures a second frame 2 while the ambient light fluctuates to its darkest intensity, the second frame 2 has the minimum average brightness; and the average brightness of the third frame 3 is between those of the first frame 1 and the second frame 2. The intensity fluctuation of frames 1 to 3 can lead to identifying an incorrect object motion.

Accordingly, the present disclosure further provides an optical sensor that alleviates or even eliminates image flickers by calculating a sum of two image frames or a sum of pixel data of every two pixels in neighboring rows of one image frame.

SUMMARY

The present disclosure provides an optical sensor that alleviates or even eliminates image flickers by adding pixel data of two image frames in a digital stage.

The present disclosure further provides an optical sensor that alleviates or even eliminates image flickers by adding pixel data of every two pixels in neighboring rows of one image frame in a digital stage.

The present disclosure further provides an optical sensor that alleviates or even eliminates image flickers by adding pixel data of every two pixels in neighboring rows of one image frame in an analog stage.

The present disclosure provides an optical sensor that acquires image frames corresponding to a flicker period of ambient light. The optical sensor includes a pixel array, a readout circuit and a processor. The pixel array is configured to acquire a first image frame corresponding to a first flicker period and acquire a second image frame corresponding to a second flicker period. The readout circuit is configured to read the first image frame and the second image frame from the pixel array. The processor is configured to add the first image frame to the second image frame to generate a sum of image frames to cancel flickers caused by the ambient light.

The present disclosure further provides an optical sensor that acquires image frames corresponding to a flicker period of ambient light. The optical sensor includes a pixel array, a readout circuit and a processor. The pixel array includes multiple pixel rows configured to acquire pixel data by a rolling shutter. The readout circuit is configured to respectively read the pixel data of the multiple pixel rows. The processor is configured to respectively add the pixel data of an N'th pixel row and an N+1'th pixel row among the multiple pixel rows to generate a first output image, wherein N is a positive odd number from 1.

The present disclosure further provides an optical sensor that acquires image frames corresponding to a flicker period of ambient light. The optical sensor includes a pixel array, a readout circuit and a processor. The pixel array includes multiple pixel rows configured to acquire pixel data by a rolling shutter. The readout circuit is configured to respectively read a data sum of the pixel data of an N'th pixel row and an N+1'th pixel row among the multiple pixel rows, wherein N is a positive odd number from 1. The processor is configured to generate an output image according to multiple data sums, wherein a longitudinal resolution of the output image is a half of a number of the multiple pixel rows.

BRIEF DESCRIPTION OF THE DRAWINGS

Other objects, advantages, and novel features of the present disclosure will become more apparent from the following detailed description when taken in conjunction with the accompanying drawings.

FIG. 5C is the switching state of the pixel circuit of FIG. 5B in operation.

DETAILED DESCRIPTION OF THE EMBODIMENT

It should be noted that, wherever possible, the same reference numbers will be used throughout the drawings to refer to the same or like parts.

The optical sensor of the present disclosure is adapted to cancel the influence from ambient light fluctuation while acquiring image frames under time-varying ambient light having a flicker period so as to improve the control accuracy based on the image processing result.

Figure 1:
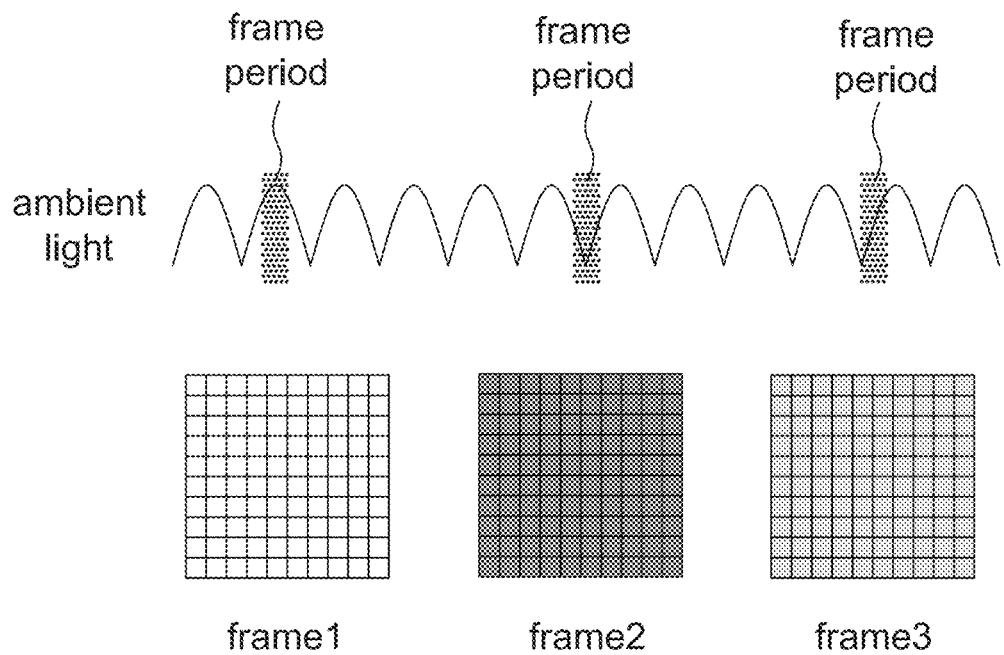
FIG. 1 is a schematic diagram of acquiring image frames corresponding to ambient light fluctuation by a conventional optical sensor.
Figure 2:
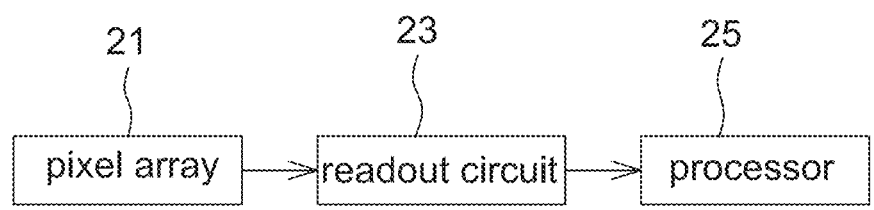
FIG. 2 is a schematic block diagram of an optical sensor according to one embodiment of the present disclosure.

Please refer to FIG. 2, it is a schematic block diagram of an optical sensor 200 according to one embodiment of the present disclosure. The optical sensor 200 is selected from a CMOS image sensor or a CCD image sensor, and is integrated in various cameras or photographing devices for the motion detection or navigation.

The optical sensor 200 includes a pixel array 21, a readout circuit 23 and a processor 36.

The pixel array 21 includes rolling shutter pixels arranged in a matrix, and outputs pixel data to generate image frames at a frame rate. In one aspect, every pixel of the pixel array 21 includes a 4T pixel circuit, e.g., including transistors T1, T3, T4 and T5 as shown in FIG. 5B.

Figure 5A:
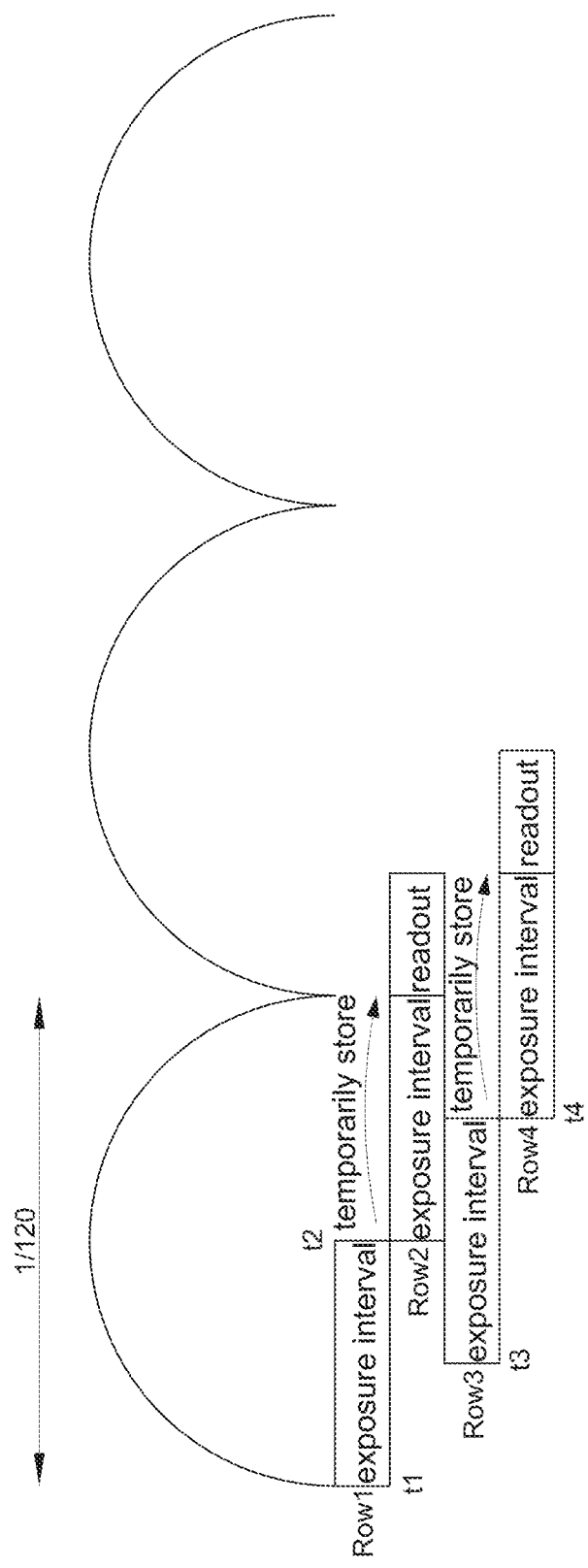
FIG. 5A is a schematic diagram of an operating method of an optical sensor according to a third embodiment of the present disclosure.
Figure 5B:
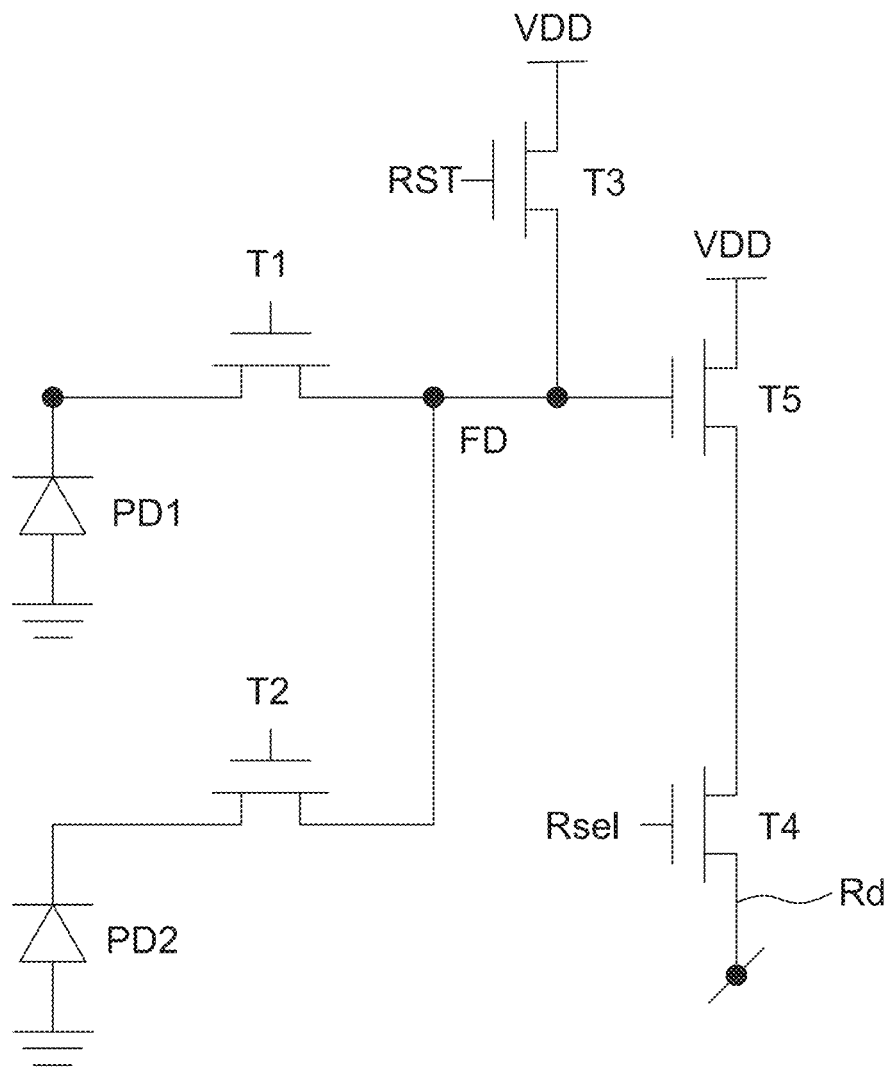
FIG. 5B is a pixel circuit of an optical sensor according to a third embodiment of the present disclosure.

The readout circuit 23 is connected to the pixel array 21, and reads pixel data of every pixel of the pixel array 21 via multiple readout lines (e.g., Rd shown in FIG. 5B). For example, the readout circuit 23 sequentially reads every pixel row of the pixel array 21 according to a row selection signal. The row selection signal is generated by, for example, a timing controller. The operation of the timing controller is known to the art and not a main objective of the present disclosure, and thus details thereof are not described herein.

The processor 25 is selected from an application specific integrated circuit (ASIC), a digital processor (DSP) or a field programmable gate array (FPGA), which receives and processes pixel data read by the readout circuit 23, e.g., calculating a sum of pixel data (given by examples below).

Figure 3A:
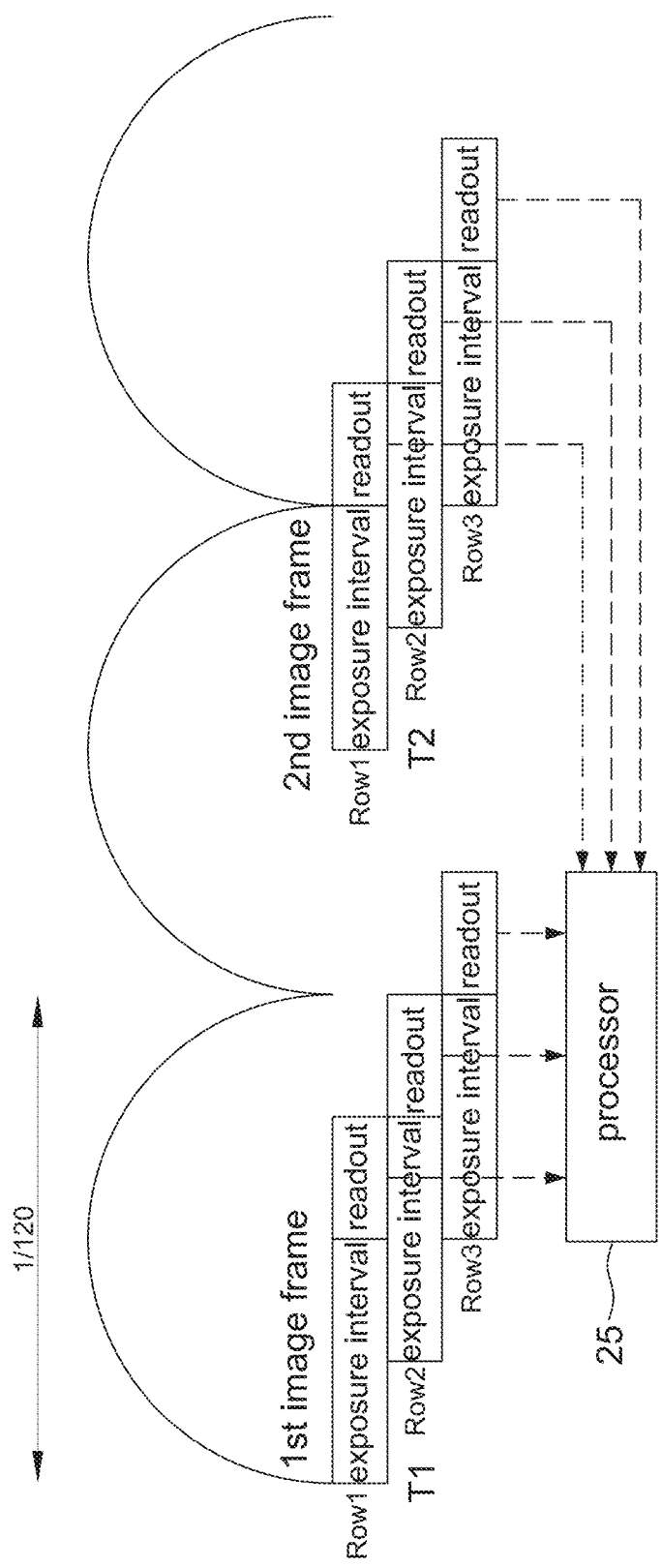
FIGS. 3A and 3B are schematic diagrams of an operating method of an optical sensor according to a first embodiment of the present disclosure.
Figure 3B:
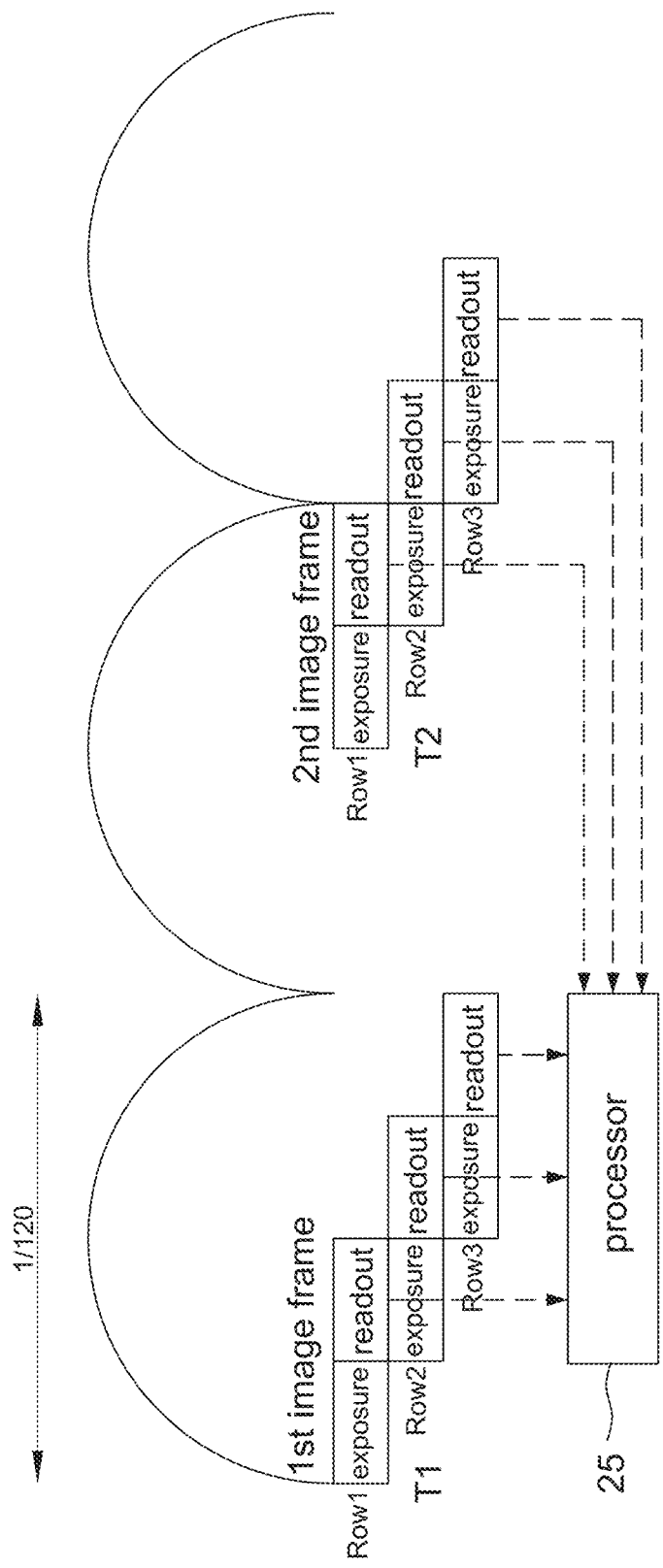

Please refer to FIGS. 3A and 3B, they are schematic diagrams of an operating method of an optical sensor 200 according to a first embodiment of the present disclosure. The first embodiment of the present disclosure cancels the image flicker by calculating a sum of two image frames, e.g., respectively adding pixel data of pixels at corresponding positions of the two image frames.

The pixel array 21 acquires a first image frame corresponding to a first flicker period and acquires a second image frame corresponding to a second flicker period. For simplification, FIGS. 3A and 3B show that the first image frame and the second image frame include only three pixel rows Row1 to Row3, but the present disclosure is not limited thereto. The number of pixel rows is determined according to an actual size of the pixel array 21.

For example, in FIGS. 3A and 3B, a start time of the first image frame is shown as T1 and a start time of the second image frame is shown as T2. The first image frame and the second image frame are respectively acquired by a rolling shutter and thus a line time difference (e.g. a time difference between start times of Row1 and Row2, between Row2 and Row3, and so on) is shown between pixel rows in FIGS. 3A and 3B. The method of capturing an image frame by a rolling shutter is known to the art, and thus details thereof are not described herein.

The readout circuit 23 respectively reads the first image frame and the second image frame corresponding to different frame periods, e.g., FIGS. 3A and 3B showing a readout interval (shown as readout for simplification) of every pixel row after each exposure interval.

The processor 25 adds the first image frame to the second image frame (e.g., pixel-by-pixel) to generate a sum of image frames to cancel the image flicker caused by ambient light, i.e. the sum of image frames having the same size as the first image frame and the second image frame. In the present disclosure, the sum of image frames is provided to the digital backend (e.g., a host) for the image recognition, motion detection, storage, playing or the like according to different applications.

In the first embodiment, an exposure interval of every pixel row of the first image frame and the second image frame is preferably smaller than a flicker period of ambient light. For example, FIG. 3A shows that an exposure interval of every pixel row of the first image frame and the second image frame is ½ (e.g., ¹⁄₂₄₀ second) of the flicker period, and FIG. 3B shows that an exposure interval of every pixel row of the first image frame and the second image frame is ¼ (e.g., ¹⁄₄₈₀ second) of the flicker period, but the present disclosure is not limited thereto.

It should be mentioned that although FIGS. 3A and 3B show that the flicker period is ¹⁄₁₂₀ second, the present disclosure is not limited thereto. A value of the flicker period is determined according to an AC frequency of a power system of the area that the optical sensor 200 is used, e.g., ¹⁄₁₀₀ second in some areas, but not limited to.

It should be mentioned that although FIGS. 3A and 3B show that the second image frame is separated from the first image frame by 1.5 times (i.e. frame period being 1.5 times of flicker period) of the flicker period to fully eliminate the image flicker, the present disclosure is not limited thereto. The image flicker is alleviated as long as a separation between the first image frame and the second image frame is set from 1.5 to 2 times of the flicker period.

In addition, although FIGS. 3A and 3B show that the start time T1 of the first image frame is aligned with the zero phase (or called start phase) of a flicker period, it is only intended to illustrate but not to limit the present disclosure. As long as a separation between the first image frame and the second image frame is set from 1.5 to 2 times of the flicker period, no matter with which phase of the flicker period that the start time T1 is aligned, the image flicker is alleviated or even eliminated by adding the first image frame to the second image frame (e.g., adding corresponding pixels of two image frames).

It should be mentioned that although FIGS. 3A and 3B show that the first image frame and the second image frame are corresponding to two adjacent flicker periods, the present disclosure is not limited thereto. In other aspects, the first image frame and the second image frame are separated by more than two flicker periods (i.e. frame period more than 2 times of flicker period), e.g., between 2.5 to 3 times of the flicker period, between 3.5 to 4 times of the flicker period, and so on, and the mage flicker is also alleviated or even eliminated by adding two adjacent image frames.

Figure 4A:
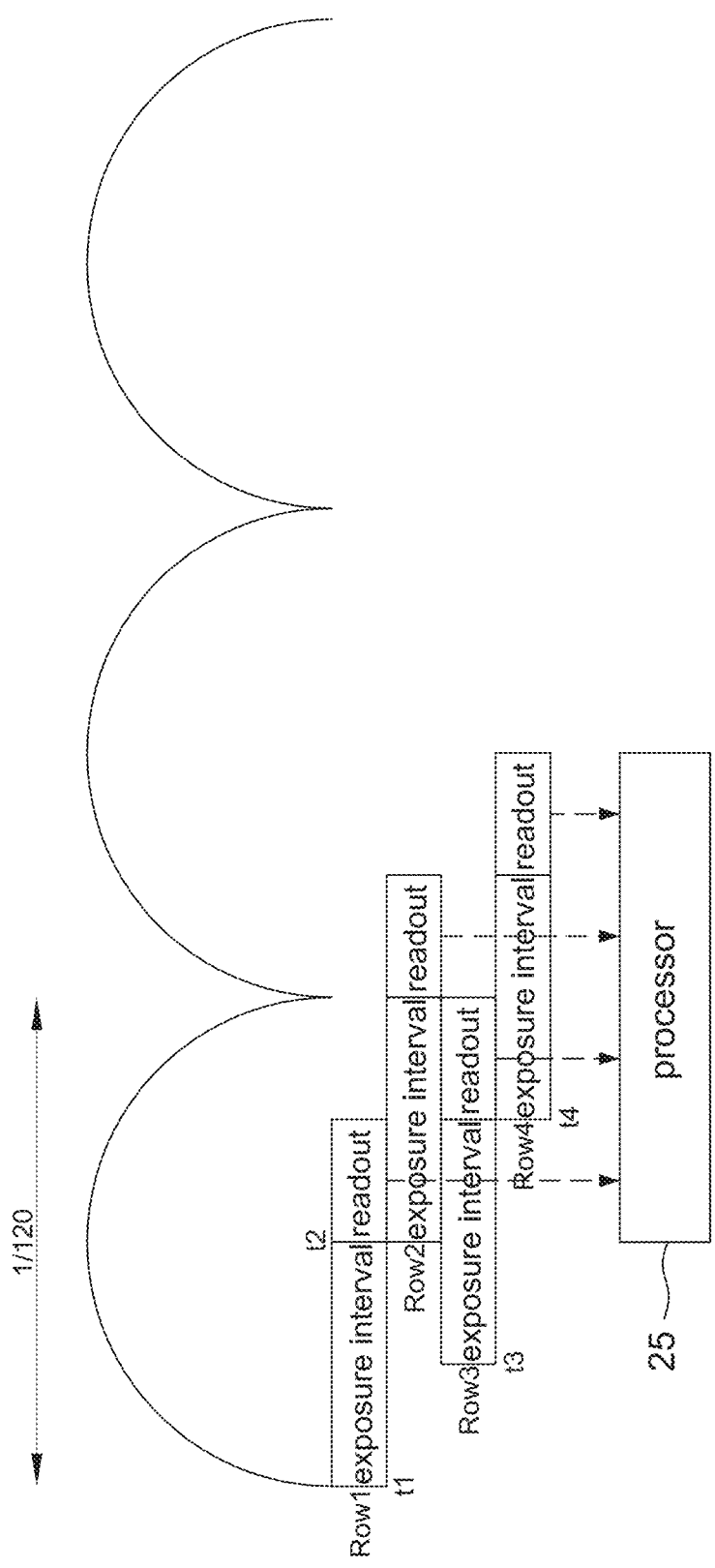
FIGS. 4A and 4B are schematic diagrams of an operating method of an optical sensor according to a second embodiment of the present disclosure.
Figure 4B:
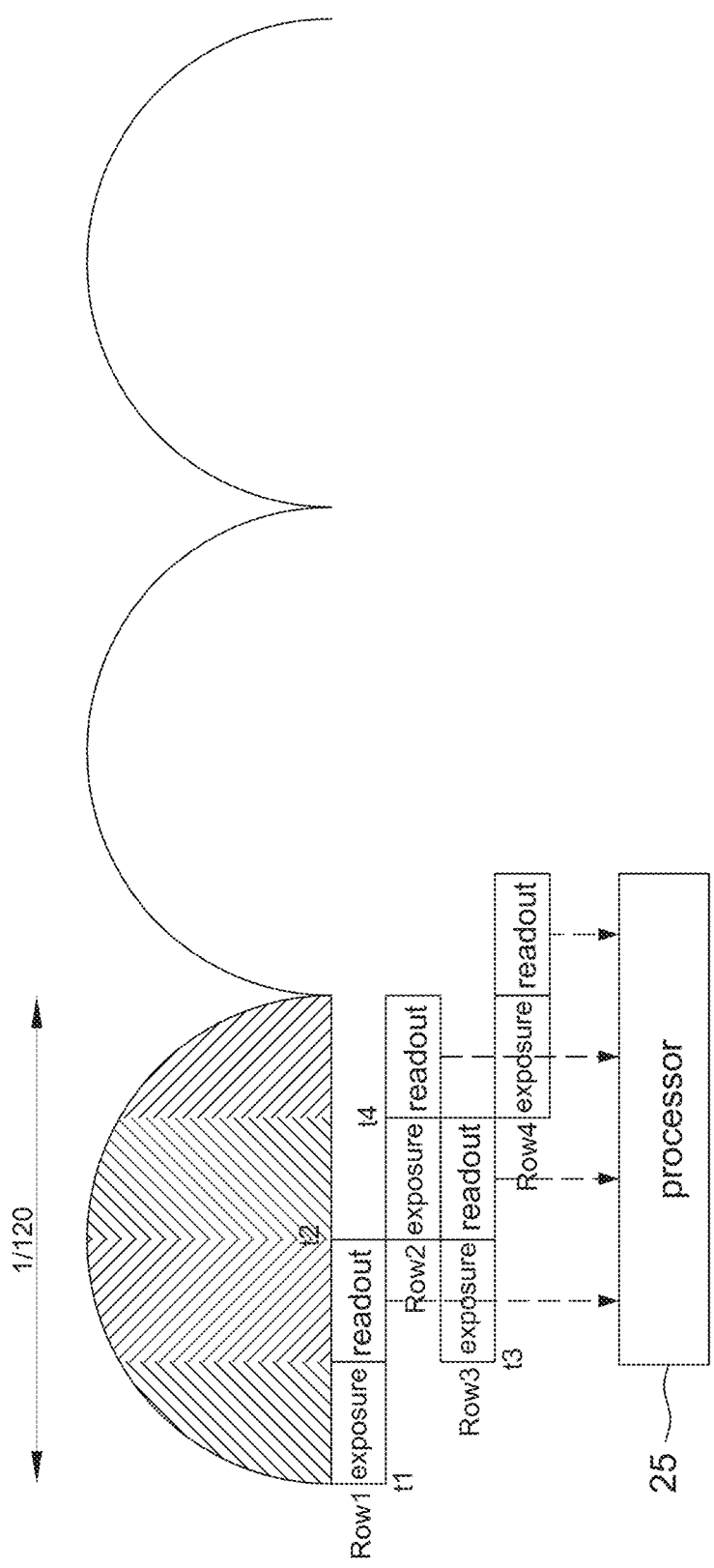

Please refer to FIGS. 4A and 4B, they are schematic diagrams of an operating method of an optical sensor 200 according to a second embodiment of the present disclosure. The second embodiment of the present disclosure is to cancel the image flicker by adding pixel data of pixels at corresponding positions of two neighboring rows.

Similarly, the pixel array 21 includes multiple pixel rows to acquire pixel data using a rolling shutter.

The readout circuit 23 respectively reads the pixel data of the multiple pixel rows, e.g., FIGS. 4A and 4B showing a readout interval (shown as readout for simplification) of every pixel row after each exposure interval (shown as exposure for simplification).

The processor 25 respectively adds pixel data of pixels in an N'th pixel row to pixels in an N+1'th pixel row pixel-by-pixel, e.g., adding corresponding pixels at the same column of two neighboring pixel rows N'th and N+1'th among the multiple pixel rows to generate a first output image, wherein N is a positive odd number from 1, e.g., 1, 3, 5 . . . , and a last value of N is determined according to a size of the pixel array 21. For example, the processor 23 adds pixel data of a first pixel row and a second pixel row acquired by the pixel array 21 pixel-by-pixel as pixel data of a first pixel row of the first output image; adds pixel data of a third pixel row and a fourth pixel row acquired by the pixel array 21 pixel-by-pixel as pixel data of a second pixel row of the first output image; and so on. In this aspect, the processor 23 does not add pixel data of the second pixel row to the third pixel row, and does not add pixel data of the fourth pixel row to the fifth pixel row, and so on. Therefore, a longitudinal resolution (i.e. a number of pixel rows) of the first output image is a half of a number of multiple pixel rows of the pixel array 21.

It is seen from FIGS. 4A and 4B that in an exposure interval of the first pixel row of the pixel array 21, the intensity of ambient light increases gradually; whereas in an exposure interval of the second pixel row of the pixel array 21, the intensity of ambient light decreases gradually. Meanwhile, in an exposure interval of the third pixel row of the pixel array 21, a trend of the changing of intensity of ambient light is opposite to a trend of the changing of intensity of ambient light in an exposure interval of the fourth pixel row of the pixel array 21.

Therefore, a data sum of summing pixel data of the first pixel row and the second pixel row pixel-by-pixel and a data sum of summing pixel data of the third pixel row and the fourth pixel row pixel-by-pixel acquired by the pixel array 21 are substantially identical (i.e. identical integrating area shown by tilt lines in different directions in FIG. 4B) such that the image flicker is cancelled.

Although FIGS. 4A and 4B show that an exposure start time (e.g., t2, t4) of the N+1'th pixel row among the multiple pixel rows of the pixel array 21 has a time difference of ½ of the flicker period from an exposure start time (e.g., t1, t3) of the N'th pixel row among the multiple pixel rows of the pixel array 21, the present disclosure is not limited thereto, In other aspects, as long as the time difference between exposure start times of the N+1'th pixel row and the N'th pixel row among the multiple pixel rows of the pixel array 21 is between ½ and ¾ of the flicker period, it has the function of alleviating the image flicker.

In the present disclosure, an exposure interval of the multiple pixel rows of the pixel array 21 is smaller than a flicker period, preferably smaller than or equal to a half of the flicker period. For example, FIG. 4A shows that the exposure interval of the multiple pixel rows is ½ of a flicker period (e.g., shown as ¹⁄₁₂₀ second); whereas, FIG. 4B shows that the exposure interval of the multiple pixel rows is ¼ of the flicker period, wherein all pixels in one pixel row having an identical exposure interval.

Furthermore, as shown in FIGS. 4A and 4B, an exposure start time of the N+1'th pixel row (e.g., even pixel row) among the multiple pixel rows of the pixel array 21 is later than an exposure start time of a next pixel row. For example, a third exposure start time t3 of the third pixel row among the multiple pixel rows is later than a first exposure start time t1 of the first pixel row among the multiple pixel rows and is prior to a second exposure start time t2 of the second pixel row among the multiple pixel rows. For example, exposure start times between the N+1'th pixel rows among the multiple pixel rows (e.g., t2 and t4) is separated by one readout interval, and exposure start times between the N'th pixel rows among the multiple pixel rows (e.g., t1 and t3) is separated by one readout interval.

As mentioned above, the first output image generated by the processor 25 has a lower resolution. Preferably, the processor 25 generates the first output image in a power saving mode, e.g., a mode in which no object is detected by the optical sensor 200. In a normal mode (e.g., a mode in which the optical sensor 200 detects an object or receiving a signal indicating an object is detected), the processor 25 respectively adds pixel data, pixel-by-pixel, of an M'th pixel row to pixel data of an M+1'th pixel row among the multiple pixel rows of the pixel array 21 to generate a second output image, wherein M is a positive integer from 1, e.g., 1, 2, 3, . . . , and a last value of M is determined according to a size of the pixel array 21. For example, the processor 23 respectively sums up pixel data of a first pixel row and a second pixel row at the same column acquired by the pixel array 21 as pixel data of a first pixel row of the second output image; respectively sums up pixel data of a second pixel row and a third pixel row at the same column acquired by the pixel array 21 as pixel data of a second pixel row of the second output image; respectively sums up pixel data of a third pixel row and a fourth pixel row at the same column acquired by the pixel array 21 as pixel data of a third pixel row of the second output image; and so on.

More specifically, the processor 25 further identifies whether an object image is acquired according to the first output image. When the processor 25 identifies that no object image is acquired, the first output image is continuously generated to a backend. When the processor 25 identifies that an object image is acquired, the second output image is generated to the backend. A longitudinal resolution of the second output image is smaller than a number of multiple pixel rows of the pixel array 21 but is larger than a longitudinal resolution of the first output image.

Please refer to FIG. 5A, it is a schematic diagram of an operating method of an optical sensor 200 according to a third embodiment of the present disclosure. The third embodiment of the present disclosure is also to cancel the image flicker by calculating a sum of pixel data of pixels in neighboring rows pixel-by-pixel. The difference between the third and the second embodiments is that the sum of pixel data in the second embodiment is calculated by the processor 25 outside the pixel circuit but the sum of pixel data in the third embodiment is calculated inside the pixel circuit, i.e., not calculated by the processor.

Similarly, the pixel array 21 includes multiple pixel rows to acquire pixel data using a rolling shutter.

As shown in FIG. 5B, each pixel of the N'th pixel row (e.g., odd row) of the pixel array 21 is integrated with a 4T pixel circuit, e.g., including transistors T1, T3, T4 and T5; and each pixel of the N+1'th pixel row (e.g., even row) of the pixel array 21 is also integrated with a 4T pixel circuit, e.g., including transistors T2, T3, T4 and T5, i.e. the N'th pixel row and the N+1'th pixel row sharing transistors T3, T4 and T5. A photodiode PD1 of each pixel of the N'th pixel row among the multiple pixel rows is connected to a same floating diffusion node FD with a photodiode PD2 of an adjacent pixel in the N+1'th pixel row among the multiple pixel rows, and the floating diffusion node FD is to store data sum of pixel data of the N+1'th pixel row and the N'th pixel row. Meanwhile, each pixel of the N'th pixel row among the multiple pixel rows is connected to a same readout line Rd with an adjacent pixel in the N+1'th pixel row among the multiple pixel rows. PD1 and PD2 in FIG. 5B are photodiodes of two adjacent pixels in a longitudinal direction (i.e. same column) of the pixel array 21.

In FIG. 5B, transistors T1 and T2 are transfer transistors; the transistor T3 is a reset transistor, the transistor T4 is a row selection transistor, controlled by a row selection signal Rsel; and the transistor T5 is a source follower transistor.

Because the sum of pixel data of pixels at the same column is directly calculated inside the pixel circuit, the readout circuit 23 directly reads a data sum of the pixel data of the N'th pixel row and the N+1'th pixel row among the multiple pixel rows of the pixel array 21 via multiple readout lines Rd respectively, wherein N is a positive odd number from 1, e.g. 1, 3, 5, . . . .

FIG. 5C shows the operating state of the transistors T1 to T3 of the N'th pixel row and the N+1'th pixel row, including phases of reset PD1, expose PD1, reset PD2, transfer PD1 & expose PD2 as well as transfer PD2 performed sequentially. It is seen from FIG. 5C that charges generated by the photodiodes PD1 and PD2 are sequentially stored in FD by charge transferring (i.e. last two columns in FIG. 5C) so as to accomplish the summation of pixel data of pixels at the same column in the analog stage.

Please refer to FIG. 5A again, the readout circuit 23 reads a data sum of the pixel data of the first pixel row Row1 and the second pixel row Row2 together after an exposure interval of the second pixel row is over; and reads a data sum of the pixel data of the third pixel row Row3 and the fourth pixel row Row4 together after an exposure interval of the fourth pixel row is over; and so on. In other words, the readout circuit 23 does not read the data in FD between the exposure intervals of the N'th pixel row and the N+1'th pixel row, e.g., FIG. 5A showing no readout interval after exposure intervals of Row1 and Row3. That is, data sum stored in FD is read by conducting T4, which is conducted in the readout interval, after exposure intervals of Row2 and Row4 shown in FIG. 5A.

Finally, the processor 25 generates an output image according to multiple data sums of the multiple pixel rows. As mentioned in the above second embodiment, a longitudinal resolution of the output image formed by the pixel array 21 is a half of a number of multiple pixel rows of the pixel array 21.

Similarly, an exposure interval of the multiple pixel rows of the pixel array 21 is smaller than or equal to ½ of a flicker period (e.g. shown as 1/120 second, but not limited to). For example, FIG. 5A shows that the exposure interval is 1/240 second.

Similarly, an exposure start time of the N+1'th pixel row among the multiple pixel rows of the pixel array 21 is later than an exposure interval of a next pixel row. For example, a third exposure start time t3 of a third pixel row of the multiple pixel rows of the pixel array 21 is later than a first exposure start time t1 of a first pixel row of the multiple pixel rows and is prior to a second exposure start time t2 of a second pixel row of the multiple pixel rows.

It should be mentioned that although the above second and third embodiments are described in the way that pixel data of two pixels in neighboring rows are added, the present disclosure is not limited thereto. In another aspect, the image flicker is cancelled by adding pixel data of more than two pixel tows. For example, when the exposure interval is arranged a ⅓ of a flicker period of ambient light, the flicker interference is released by adding (e.g., in the digital stage or analog stage) pixel data of three pixels in neighboring rows; and so on. In an aspect by adding pixel data in the analog stage, photodiodes of three adjacent pixel rows are connected to the same floating diffusion node to store the data sum similar to FIG. 5B.

As mentioned above, the conventional motion sensor can be influenced by ambient light flicker to possibly have incorrect motion identification. Accordingly, the present disclosure further provides an operating method (e.g., FIGS. 3A to 4A) and a pixel circuit of an optical sensor (FIG. 5B) that can at least release or even eliminate flickers caused by time-varying ambient light by adding two image frames or adding pixel data of every two pixels in neighboring rows of one image frame without synchronizing the image capturing to a flicker frequency.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. An optical sensor, configured to acquire image frames corresponding to a flicker period of ambient light, the optical sensor comprising:
   a pixel array, configured to acquire a first image frame corresponding to a first flicker period and acquire a second image frame corresponding to a second flicker period;
   a readout circuit, configured to read the first image frame and the second image frame from the pixel array; and
   a processor, configured to add the first image frame to the second image frame to generate a sum of image frames to cancel flickers caused by the ambient light,
   wherein the second image frame is separated from the first image frame by 1.5 times of the flicker period.

2. The optical sensor as claimed in claim 1, wherein the first flicker period and the second flicker period are two adjacent flicker periods of the ambient light.

3. The optical sensor as claimed in claim 1, wherein an exposure interval of every pixel row of the first image frame and the second image frame is smaller than the flicker period.

4. The optical sensor as claimed in claim 1, wherein the pixel array includes rolling shutter pixels, and the first image frame and the second image frame are acquired by a rolling shutter.

5. The optical sensor as claimed in claim 1, wherein an exposure interval of every pixel row of the first image frame and the second image frame is identical to ½ or ¼ of the flicker period.

6. An optical sensor, configured to acquire image frames corresponding to a flicker period of ambient light, the optical sensor comprising:
   a pixel array, configured to acquire a first image frame corresponding to a first flicker period and acquire a second image frame corresponding to a second flicker period;
   a readout circuit, configured to read the first image frame and the second image frame from the pixel array; and
   a processor, configured to add the first image frame to the second image frame to generate a sum of image frames to cancel flickers caused by the ambient light,
   wherein an exposure interval of every pixel row of the first image frame and the second image frame is identical to ½ or ¼ of the flicker period.

* * * * *